United States Patent [19]
Burckhardt et al.

[11] 3,796,409
[45] Mar. 12, 1974

[54] RAPIDLY SHIFTING LEAKAGE-PROOF ELECTROMAGNETICALLY ACTUATED VALVE

[75] Inventors: Manfred H. Burckhardt, Waiblingen; Paul Schwerdt, Esslingen-Hegensberg, both of Germany

[73] Assignee: Daimler-Benz Aktiengesellschaft, Stuttgart-Unterturkheim, Germany

[22] Filed: Aug. 13, 1971

[21] Appl. No.: 171,611

[30] Foreign Application Priority Data
Aug. 13, 1970 Germany............................ 2040199

[52] U.S. Cl................. 251/139, 251/141, 336/205
[51] Int. Cl............................................. F16k 31/06
[58] Field of Search................... 251/129, 141, 139; 336/205

[56] References Cited
UNITED STATES PATENTS
2,489,867  11/1949  D'Orio............................ 336/205 X
3,218,022  11/1965  Lewis.............................. 251/141 X
3,450,353  6/1969  Eckert............................ 251/141 X
3,529,620  9/1970  Leiber............................. 251/139 X
3,633,869  1/1972  Lehmann............................. 251/129
3,670,768  6/1972  Griswold.......................... 251/141 X

*Primary Examiner*—Arnold Rosenthal
*Attorney, Agent, or Firm*—Craig and Antonelli

[57] ABSTRACT

A rapidly shifting leak-proof electromagnetically actuated valve for liquids or gases with direct hydraulic control of the medium to be shifted and with an adjustable piston armature in which the stroke of the piston armature, which is readily slidable and liftable, as also the gap between the piston armature and the pole element can be held within predetermined limits; the pole element forms directly the support of a coil wound in a small space with a large number of turns whereby a short, closed magnetic circuit is obtained by the appropriate construction of the valve.

30 Claims, 5 Drawing Figures

INVENTORS
MANFRED H. BURCKHARDT
PAUL SCHWERDT

BY Craig, Antonelli & Hill

ATTORNEYS

RAPIDLY SHIFTING LEAKAGE-PROOF ELECTROMAGNETICALLY ACTUATED VALVE

The present invention relates to a rapidly shifting, leak-proof electromagnetically actuated valve for liquids or gases with direct hydraulic control of the medium to be controlled as well as with an adjustable piston armature.

Such types or electromagnetically actuated valves are utilized in the regulating and control art for the control of the periodic flow of liquids or gases at pressures of up to 250 atmospheres. The valves are utilized, for example, in connection with the electronic fuel injection, with the electronically regulated control period modulation of the gas exchange operations in internal combustion engines, with the brake slippage control system, with transmission controls and with similar devices. It is therefore readily understandable that the shifting periods should be very short whereby the working pressure should have no influence, if possible, on the shifting period. Such valves are therefore frequently required and frequently also several such valves have to be accommodated in a narrow structural space. It is therefore important that these valves can be manufactured with lowest expenditures and with smallest dimensions. Additionally, in particular with the use in brake systems, no leakage losses must occur. Hydraulic pre-controlled valves are known in the art which permit very short shifting periods. However, they cannot satisfy the aforementioned requirements to the desired extent.

It is the aim of the present invention to still further reduce the shifting periods compared to the known constructions and to propose embodiments which possess slight geometric dimensions and can be manufactured relatively inexpensively.

The underlying problems are solved according to the present invention in that both the stroke of the readily slidable and liftable piston armature as also the gap between the piston armature and the pole element are determinable within predetermined limits whereby the pole element at the same time directly forms the support of the winding or coil wound in the predetermined small frame with largest possible number of turns, which coil, by reason of a suitable construction of the valve, produces a short, closed magnetic circuit.

According to a further feature of the present invention, the outer surface of the piston armature may be provided with a sliding layer preferably consisting of non-magnetic metal or plastic material. A rapid lift-off of the piston armature from its seat can be achieved thereby, especially if the play resulting between the guide surface of the valve housing and the sliding layer has at most the thickness of the sliding layer. Furthermore, the fast discharge of the medium to be controlled serves for the rapid lifting off of the piston armature, which can be achieved in that grooves are provided at least at one of the mutually opposite end faces of the piston armature and of the pole element. Moreover, for the rapid lifting off of the piston armature, the gap formed between the latter and the pole element and the stroke of the piston armature are to be adjustable by the particular construction according to the present invention. The gap can be adjusted best in that different parts of the valves, namely, a bearing needle with a hemispherically shaped head and a seating ring, are individually measured or gauged matching one another as interchangeable mass-produced parts and the desired gap magnitude is determined by selection during the assembly of the individual valve. On the other hand, the stroke of the piston armature can be adjusted in that a hollow screw, screwed into a cover closing the valve housing and secured in its installed depth by a counter nut, is screwed more or less deeply into the same.

A tightly wound coil contributes not only to the construction with small dimensions but also to the attainment of a short closed magnetic circuit, whereby the coil is wound without the use of any special coil body. For that purpose, according to the present invention, the maximum possible number of turns of a coil wire provided with a thin, hardenable lacquer layer is wound directly on the pole element with the aid of a conventional axial-winding coil form as tightly as possible and filling the entire small space which results, according to the present invention, between the valve housing and the pole element from apertures and which is matched to the required number of turns. Prior to the emplacement of the valve housing over the thus-wound coil, the latter is heated by a defined current surge or current pulse so that the lacquer and therewith the wire turns are bonded and hardened into a rigid coil packet.

In order to eliminate eddy currents and to avoid leakage losses, the space of the coil packet is limited by a ring of glass-fiber reinforced synthetic resinous material which serves as support of a sealing ring that seals the space of the oil packet with respect to the chamber, through which flows the working medium. By reason of the fact that the coil due to the hardened lacquer represents a resistant, closed body it is able to readily withstand without any difficulty force acting in the axial direction of the valve on the sealing ring and therewith also on the coil, which force is produced by the working pressure of the medium.

Accordingly, it is an object of the present invention to provide a quick-acting, leakage-proof electromagnetic valve which avoids by simple means the aforementioned shortcomings and drawbacks encountered in the prior art.

Another object of the present invention resides in a rapidly shifting leakage-proof electromagnetically actuated valve which permits extraordinarily short shifting durations while minimizing the influence of the pressure of the working medium on the shifting duration.

A further object of the present invention resides in quick-acting leakage-proof electromagnetically actuated valve of the type described above which is reliable in operation, simple in construction and relatively inexpensive in manufacture.

Still another object of the present invention resides in an electromagnetically actuated valve which utilizes mass-produced parts, yet permits an accurate control of certain critical dimensions These and further objects, features and advantages of the present invention will become more apparent from the following description when taken in connection with the accompanying drawing which shows, for purposes of illustration only, two embodiments in accordance with the present invention, and wherein.

Figure 4:
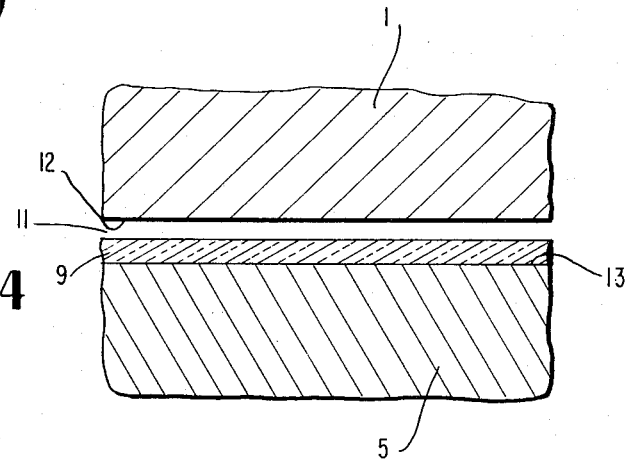
Figure 5:
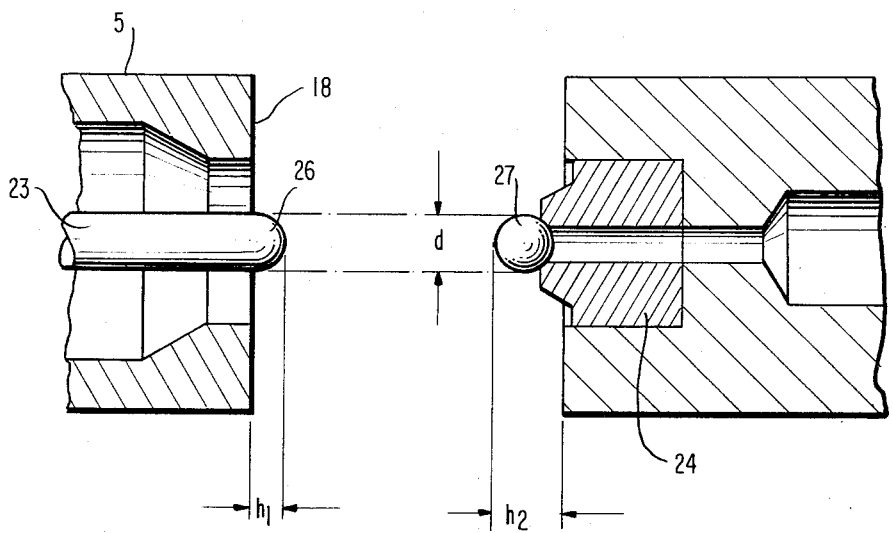

FIG. 4 is a partial cross-sectional view, on an enlarged scale, in the axial direction through an edge zone of the piston armature and of the areas of the valve housing adjoining the same; and FIG. 5 is an axial cross-sectional view through a part of the piston armature with the bearing needle having a hemispherically shaped head and a part of the pole element disposed opposite the same with a seating ring and a measuring ball placed on the same.

Figure 1:
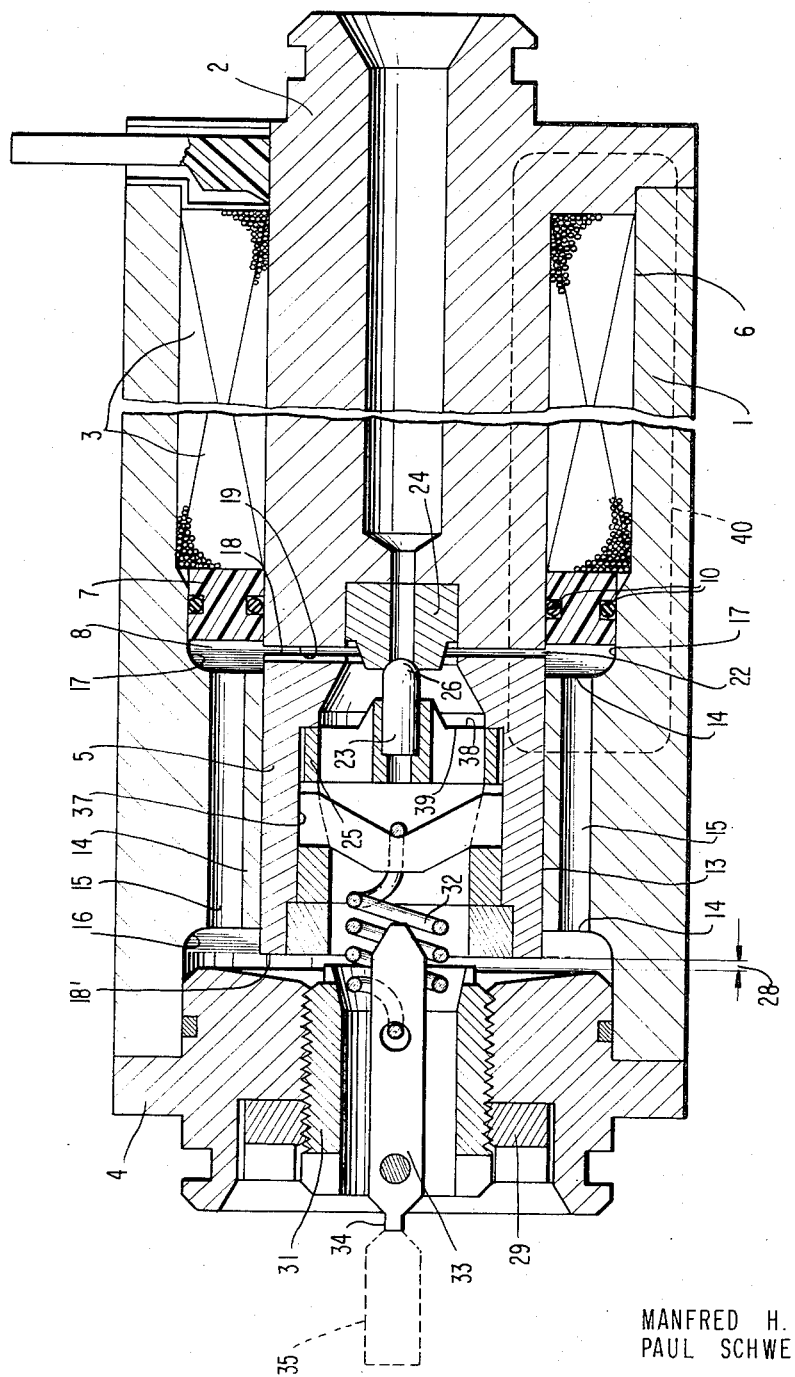
FIG. 1 is an axial cross-sectional view through an inlet valve in accordance with the present invention which is opened in the de-energized condition.

Referring now to the drawing wherein like reference numerals are used throughout the various views to designate like parts, and more particularly to FIG. 1, the inlet valve illustrated in this figure in axial cross section essentially consists of the valve housing 1, of the pole element 2, inserted into the valve housing 1, and of the coil 3 nearly completely filling the free space between the valve housing 1 and the pole element 2 as well as of the cover 4 and of the piston armature 5 reciprocating in the valve housing 1 between the cover 4 and the pole element 2.

Short shifting periods can be achieved by the use of such a valve in that, on the one hand, the inductance of the coil is kept as low as possible and, on the other, the ohmic resistance of the coil is as large as possible. In order to achieve the necessary attraction force at the piston armature 5 notwithstanding the slight inductance, it is necessary to keep the magnetic stray losses as small as possible. Consequently, the present invention is concerned with the task to achieve by a suitable construction of the valve body which is composed in this case of the valve housing 1, of the coil 3, of the pole element 2 and of the piston armature 5, as short as possible a closed magnetic circuit 40 by way of the aforementioned parts. For that purpose, all sharp edges or extensions, shoulders, projections or the like must be avoided at the magnetically conductive parts in the direct vicinity of the coil 3. Additionally, the same purpose is served by the fact that the coil and the magnetically conductive parts are disposed as close adjacent to and within one another. Consequently, both the valve housing 1 as also the pole element 2 are so constructed that their cross-sectional areas are essentially rectangular and together with the coil fit together and into one another. For that purpose, into the small space 6 made available between the valve housing 1 and the pole element 2 which is closely matched to the required number of turns, the maximum possible number of turns of a coil wire is installed, i.e., is at first wound tightly on the pole element 2 by means of an axial winding coil form of conventional type. This coil wire is provided with a thin hardenable lacquer layer. After the winding operation, the coil is heated by a defined current surge or pulse so that the lacquer and therewith the windings are glued together and hardened into a rigid coil packet. Since the coil 3 is wound directly on the pole element 2, the heat conduction to the magnetic core is greatly favored during the operation.

The hardened or cured coil is so rigid that it is able to withstand without difficulty the force acting in the axial direction of the valve on the ring 7 and therewith additionally on the coil 3, which results from the working pressure of the medium. The ring 7 may be made of any non-magnetic material. However, if the ring is electrically conductive, eddy currents occur which lengthen the shifting period. Consequently, the present invention proposes for the reduction of the shifting period of the valve that the ring 7 be made of non-conductive material of corresponding rigidity, for example, of a glass fiber reinforced polyamide of any appropriate type, as is commercially available. The space of the coil packet is additionally sealed by this ring 7 with respect to the chamber 8 traversed by the working medium in that it is the support of sealing rings 10. The leakage-proof nature of the valve is thereby also ensured at the same time.

It is of decisive importance for the completely satisfactory operation of the valve that the piston armature 5 can slide in the valve housing 1 as easily as possible. The piston armature 5 is therefore provided with a sliding layer 9 (FIG. 4) of bronze, molybdenum or other known plastic material, such as, known synthetic resinous sliding materials. A Teflon layer has proved itself in particular which precludes the occurrence of eddy currents during the build-up and decrease of the magnetic field. Additionally, it must be avoided that eccentric magnetic forces occur. At least, however, the magnetic eccentricity has to be kept small. The play 11 necessary between the valve housing 1 and the piston armature 5 and its sliding layer 9 must therefore be kept as small as possible with respect to the sliding layer 9. This means, however, that the inner guide surface 12 of the valve housing 1 for the piston armature 5 sliding within the same, its outer diameter 13, and the sliding layer 9 applied thereon must be so dimensioned that the tolerance 11 necessary between the inner guide surface 12 and the outer surface 13 of the sliding layer 9 has at most the thickness of the sliding layer 9, possibly, however, is smaller than the thickness of this sliding layer. This is so as smallest play and smallest sliding layer assure a minimum in magnetic losses and thus an optimum desirable attraction force of the piston armature 5.

Figure 3:
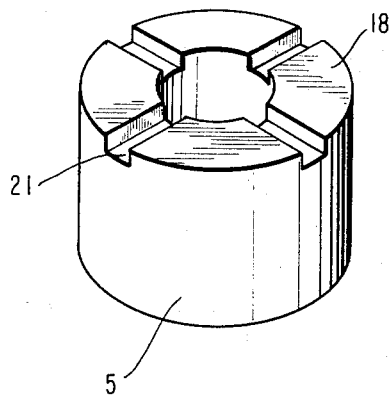
FIG. 3 is a perspective view of a piston armature in accordance with the present invention.

The piston armature 5 is surrounded by the medium to be controlled which it must displace during its movement. In order to reduce the resistances occurring during such displacement, which act in a manner lengthening the shifting duration, several apertures 15 (FIG. 1) are provided in the part 14 of the valve housing 1 surrounding the piston armature 5 which connect with each other the chamber sections 16 and 17. Additionally, grooves 21 (FIG. 3) are provided at least at one of the mutually oppositely disposed end faces 18 and 19 of the piston armature 5 or of the pole element 2 which permit a rapid displacement of the medium also in case of a small gap 22.

This gap 22 should be small if possible, however, it should not be smaller than a dimension of 1/10 mm. as otherwise the piston armature 5 adheres. Since the gap 22 thus has a considerably influence on the function of the valve, it is necessary, to give maximum consideration to the gap during the construction and assembly of the valve as regards its determinability. By the selection of the parts during mass-production, the dimension for the gap 22 resulting during the assembly of a valve can be easily predetermined and therewith the tolerance for the size of the gap can be considerably reduced thereby by simple means of the preselection. This can be achieved essentially in that the gap is formed by the mutually opposite position of a bearing needle 23 and of a seating ring 24, and in that these parts are measured in mass production and corresponding to the result of this measurement are used or are re-machined prior to use. The bearing needle and the seat together with the associated parts thereof are so constructed that the bearing needle, which is supported in the piston armature 5 by means of a needle holder 25, projects out of the same with a hemispherically shaped head portion 26 that serves as sealing element. The seating ring 24 is disposed on the opposite side in the pole element 2, which forms the valve seat for the bearing needle 23.

One proceeds for the measurement of the gap in the following manner as will be explained by reference to FIG. 5:

The dimension for the gap 22 is obtained from the equations $s = h_1 + h_2 - d$. For the determination of the size of the gap, the dimension $h_1$, i.e., therefore the size is measured prior to the assembly of the valve by which the bearing needle 23 projects out of the piston armature 5. Additionally, the dimension $h_2$ is determined in that a measuring ball 27 with a diameter corresponding to the diameter of the semi-spherically shaped head 26 is mounted on the seating ring 24 and then the dimension $h_2$ is measured or gauged. The size of the gap 22 then is obtained from the foregoing equation. If the dimension for the gap does not lie within the provided limits, then either other parts have to be selected or the selected parts have to be re-machined or refinished.

The valve stroke 28 (FIG. 1) of the piston armature 5 is adjustable in an advantageous manner from one side with the aid of a hollow screw 31 secured by a counter-nut 29. The hollow screw 31 is screwed into the cover 4 closing the valve housing 1.

The piston armature 5 is retracted by a tension spring 32 which is suspended at the spring support 33. The tension spring 32 therefore engages, on the one hand, at the piston armature 5 and, on the other, at the hollow screw 31 and seeks thereby to lift or pull off the bearing needle 23 from its seating ring 24 opposite the spring engagement thereof. When the current flowing through the coil 3 is turned on, the spring force of the tension spring 32 is, of course, overcome and the piston armature 5 is attracted toward the pole element 2 so that the bearing needle 23 with the hemispherically shaped head 26 abuts sealingly on the seating ring 24 and thus prevents the further passage of the medium through the inside of the pole element 2 forming an appropriate passage therefor.

The spring support 33, for the facilitated assembly is initially extended by the handle portion 35, to be discarded, by way of the tapering 34, whereby the handle portion 35 is broken off after the completion of the assembly.

Figure 2:
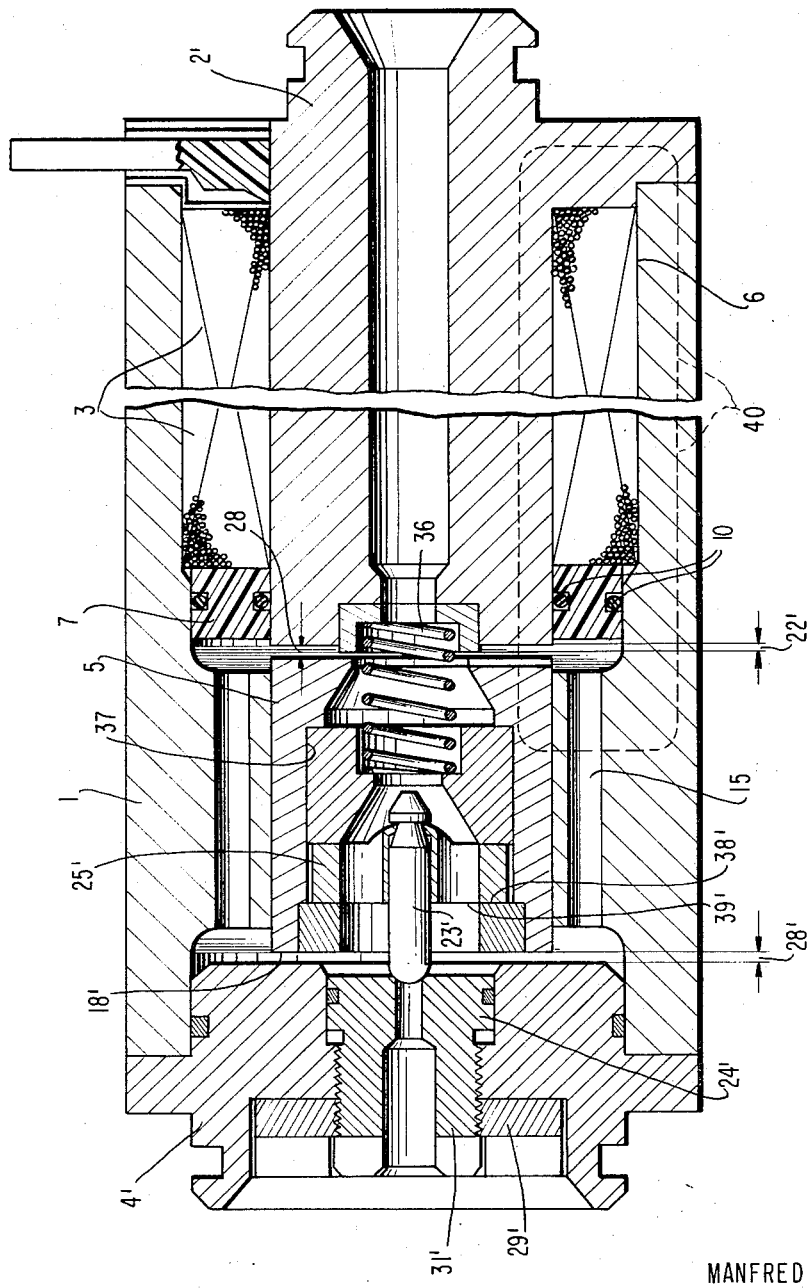
FIG. 2 is an axial cross-sectional view through an outlet valve in accordance with the present invention which is closed when de-energized.

The outlet valve illustrated in FIG. 2 is constructed in a manner similar to the inlet valve of FIG. 1. In the embodiment of FIG. 2, only a compression spring 36 is used in lieu of the tension spring 32. As to the rest, the valve is so constructed that the compression spring 36 engaging, on the one hand, at the pole element 2' and, on the other, at the piston armature 5' seeks to press the piston armature 5' together with the bearing needle 23' against a hollow screw 31' screwed into the cover 4' and forming at the same time the seating ring of the bearing needle 23'.

As to the rest, the valves are so constructed that the bearing needle support 25 or 25' is seated with radial play in a bore 37 of the piston armature 5 or 5' and abuts with an end face 38 or 38' opposite the spring 32 or 36 at an abutment surface 39 or 39' connected with the piston armature 5 and 5' respectively.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A rapidly shifting, leak-proof electromagnetically actuated valve for liquids or gases with a direct hydraulic control of the medium to be shifted and with a pole element and an adjustable piston armature means, characterized in that a gap formed between said piston armature means and said pole element is determinable within predetermined limits, said pole element directly supporting a coil wound thereon in a predetermined small space with a large number of turns, in that the construction of the valve provides a short closed magnetic circuit for the field produced by said coil, and wherein the small space provided between the valve housing means and the pole element is filled out with the largest possible number of turns of coil wire in that a thin coil wire provided with a hardenable lacquer layer which is wound directly on the pole element with a large number of turns, avoiding a separate coil form, is heated by a defined current pulse that bonds together the wire turns and hardens the lacquer and therewith forms the wire turns into a rigid coil packet.

2. A valve according to claim 1, characterized in that the stroke of the piston armature means is also adjustable.

3. A valve according to claim 2, characterized in that said piston armature means includes further means rendering the same readily slidable and liftable.

4. A valve according to claim 3, characterized in that said further means includes a sliding layer at the outer surface of the piston armature means.

5. A valve according to claim 4, characterized in that said sliding layer consists of a non-magnetic material selected from one of a metal and plastic material.

6. A rapidly shifting, leak-proof electromagnetically actuated valve for liquids or gases with a direct hydraulic control of the medium to be shifted and with a pole element and an adjustable piston armature means, characterized in that a gap formed between said piston armature means and said pole element is determinable within predetermined limits, said pole element directly supporting a coil wound thereon in a predetermined small space with a large number of turns, in that the construction of the valve provides a short closed magnetic circuit for the field produced by said coil, in that the stroke of the piston armature means is also adjustable, in that said piston armature means includes further means rendering the same readily slidable and liftable, said further means including a sliding layer at the outer surface of said piston armature means, in that said valve housing means is provided with an inner guide surface means for the piston armature means, and in that the inner guide surfaces means, the outer diameter of the piston armature means and the sliding layer thereon are so dimensioned that the play resulting between the guide surface means and the sliding layer has, at most, the thickness of the sliding layer.

7. A valve according to claim 6, characterized in that the gap is between two mutually opposite end faces of the piston armature means and in that said further means includes groove means provided at least at one of the two mutually opposite end faces of the piston armature means and the pole element.

8. A valve according to claim 7, characterized in that the gap is formed by a bearing needle having a substantially hemispherically shaped head portion serving as sealing element supported in the piston armature means by a needle mounting means and projecting out of the piston armature means, and by a seating ring means inserted into one of the pole element and a cover means closing the valve housing, the sealing ring means forming the valve seat for the bearing needle, each of the bearing needle and the steering ring means being detachable members and selected from a plurality of differently dimensioned bearing needles and seating ring means for the determination of the gap.

9. A valve according to claim 8, characterized in that said seating ring means is formed of non-magnetic material.

10. A valve according to claim 8, characterized in that the stroke of the piston armature means is adjustable from one end by the hollow screw means screwed into the cover means closing the valve housing means and secured in its screwed-in depth by a counter nut.

11. A valve according to claim 10, wherein the small space provided between the valve housing means and the pole element is filled out with the largest possible number of turns of coil wire in that a thin coil wire provided with a hardenable lacquer layer which is wound directly on the pole element with a large number of turns, avoiding a separate coil form, is heated by a defined current pulse that bonds together the wire turns and hardens the lacquer and therewith forms the wire turns into a rigid coil packet.

12. A valve according to claim 11, characterized in that the space of the coil packet is delimited with respect to the chamber through which flows the working medium by a ring means of glass fiber reinforced plastic material which is the support of at least one sealing ring.

13. A valve according to claim 11, characterized by an over-all construction thereof which avoids offsets and sharp edges and in which the pole element, valve housing means, and piston armature means have simple, substantially rectangular shapes as viewed in axial cross section fitting one within the other, thus forming a short closed magnetic circuit by way of the adjacent parts of the pole element, the valve housing means and the piston armature means.

14. A valve according to claim 13, which is constructed as inlet valve, characterized in that a tension spring engaging, on the one hand, into the hollow screw means screwed into the cover means, and on the other, at the piston armature means, seeks to lift the piston armature means together with its bearing needle from its seating ring means opposite the spring engagement.

15. An inlet valve according to claim 14, characterized in that a discardable handle is arranged at a spring mounting means inserted into the hollow screw means and supported thereon by way of a tapered portion which can be broken off after the insertion of the spring mounting means.

16. A valve according to claim 13, which is constructed as outlet valve, characterized in that a compression spring engaging, on the one hand, at the pole element and, on the other at the piston armature means, seeks to press the piston armature means with its bearing needle means against the hollow screw means screwed into the cover means and forming simultaneously the seating ring means of the bearing needle means.

17. A valve according to claim 13, characterized in that the bearing needle mounting means is seated with radial play in a bore of the piston armature means and abuts with an end face opposite the spring means at an abutment surface connected with the piston armature means.

18. A valve according to claim 17, characterized in that the portion of valve housing means surrounding the piston armature means is provided with passages which connect with each other the chamber portions traversed by the working medium and disposed on both end faces of the piston armature means.

19. A valve with a valve housing means according to claim 1, characterized in that said piston armature means is provided with a sliding layer and said valve housing means is provided with an inner guide surface means for the piston armature means, and in that the inner guide surface means, the outer diameter of the piston armature means and the sliding layer thereon are so dimensioned that the play resulting between the guide surface means and the sliding layer has, at most, the thickness of the sliding layer.

20. A valve according to claim 19, characterized in that the gap is between two mutually opposite end faces of the piston armature means and in that groove means are provided at least at one of the two mutually opposite end faces of the piston armature means and the pole element.

21. A rapidly shifting, leak-proof electromagnetically actuated valve for liquids or gases with a direct hydraulic control of the medium to be shifted and with a pole element and an adjustable piston armature means, characterized in that a gap formed between said piston armature means and said pole element is determinable within predetermined limits, said pole element directly supporting a coil wound thereon in a predetermined small space with a large number of turns, in that the construction of the valve provides a short closed magnetic circuit for the field produced by said coil, and in that the gap is formed by a bearing needle having a substantially hemispherically shaped head portion serving as sealing element supported in the piston armature means by a needle mounting means and projecting out of the piston armature means, and by a seating ring means inserted into the pole element and forming the valve seat for the bearing needle, each of the bearing needle and the steering ring means being detachable members and selected from a plurality of differently dimensioned bearing needles and seating ring means for the determination of the gap.

22. A valve according to claim 21, characterized in that said seating ring means is formed of non-magnetic material.

23. A rapidly shifting, leak-proof electromagnetically actuated valve for liquids or gases with a direct hydraulic control of the medium to be shifted and with a pole element and an adjustable piston armature means, characterized in that a gap formed between said piston armature means and said pole element is determinable within predetermined limits, said pole element directly supporting a coil wound thereon in a predetermined small space with a large number of turns, in that the construction of the valve provides a short closed magnetic circuit for the field produced by said coil, and in that the stroke of the piston armature means is adjustable from one end by a hollow screw means screwed into a cover means closing the valve housing means and secured in its screwed-in depth by a counter nut.

24. A valve according to claim 24, characterized in that the space of the coil packet is delimited with respect to the chamber through which flows the working medium by a ring means of glass fiber reinforced plastic material which is the support of at least one sealing ring.

25. A valve according to claim 1, characterized by an over-all construction thereof which avoids offsets and sharp edges and in which the pole element, valve housing means, and piston armature means have simple, substantially rectangular shapes as viewed in axial cross section fitting one with the other, thus forming a short closed magnetic circuit by way of the adjacent parts of the pole element, the valve housing means and the piston armature means.

26. A valve according to claim 23, which is constructed as inlet valve, characterized in that a tension spring engaging, on the one hand, into the hollow screw means screwed into the cover means, and on the other, at the piston armature means, seeks to lift the piston armature means together with its bearing needle from its seating ring means opposite the spring engagement.

27. An inlet valve according to claim 26, characterized in that a discardable handle is arranged at a spring mounting means inserted into the hollow screw means and supported thereon by way of a tapered portion which can be broken off after the insertion of the spring mounting means.

28. A valve according to claim 23, which is constructed as outlet valve, characterized in that a compression spring engaging, on the one hand, at the pole element and, on the other at the piston armature means, seeks to press the piston armature means with its bearing needle means against the hollow screw means screwed into the cover means and forming simultaneously the seating ring means of the bearing needle means.

29. A valve according to claim 21, characterized in that the bearing needle mounting means is seated with radial play in a bore of the piston armature means and abuts with an end face opposite a spring means at an abutment surface connected with the piston armature means.

30. A rapidly shifting, leakproof electromagnetically actuated valve for liquids or gases with a direct hydraulic control of the medium to be shifted and with a pole element and an adjustable piston armature means, characterized in that a gap formed between said piston armature means and said pole element is determinable within predetermined limits, said pole element directly supporting a coil wound thereon in a predetermined small space with a large number of turns, in that the construction of the valve provides a short closed magnetic circuit for the field produced by said coil, and in that the portion of valve housing means surrounding the piston armature means is provided with passages which connect with each other the chamber portions traversed by the working medium and disposed on both end faces of the piston armature means.

* * * * *